US012640935B1

(12) United States Patent
Norton et al.

(10) Patent No.: US 12,640,935 B1
(45) Date of Patent: May 26, 2026

(54) METHOD AND SYSTEM FOR GENERATING A LIMITED MUTABLE NFT DIGITAL CERTIFICATE OF AUTHENTICITY

(71) Applicant: Verisart, Inc., Los Angeles, CA (US)

(72) Inventors: Robert Norton, Los Angeles, CA (US); John Wood, London (GB)

(73) Assignee: Verisart, Inc., Los Angeles, CA (US)

( * ) Notice: Subject to any disclaimer, the term of this patent is extended or adjusted under 35 U.S.C. 154(b) by 0 days.

(21) Appl. No.: 18/763,976

(22) Filed: Jul. 3, 2024

Related U.S. Application Data

(63) Continuation-in-part of application No. 17/988,644, filed on Nov. 16, 2022, now Pat. No. 12,177,366, which is a continuation-in-part of application No. 17/384,432, filed on Jul. 23, 2021, now Pat. No. 11,764,974, which is a continuation-in-part of application No. 17/156,163, filed on Jan. 22, 2021, now Pat. No. 11,075,766.

(60) Provisional application No. 63/281,542, filed on Nov. 19, 2021.

(51) Int. Cl.
H04L 9/32 (2006.01)
H04L 9/00 (2022.01)

(52) U.S. Cl.
CPC .......... H04L 9/3263 (2013.01); H04L 9/3213 (2013.01); H04L 9/50 (2022.05)

(58) Field of Classification Search
CPC ........ H04L 9/3263; H04L 9/3213; H04L 9/50
See application file for complete search history.

(56) References Cited

U.S. PATENT DOCUMENTS

| | | | |
|---|---|---|---|
| 12,235,984 B1 * | 2/2025 | Ramesh | G06F 21/64 |
| 2022/0309491 A1 * | 9/2022 | Shapiro | G06F 21/64 |
| 2023/0080927 A1 * | 3/2023 | Padmanabhan | G06Q 20/381 |
| | | | 705/64 |
| 2023/0334488 A1 * | 10/2023 | Reineke | H04L 9/50 |
| 2023/0336348 A1 * | 10/2023 | Yoon | H04L 9/3213 |
| 2024/0029056 A1 * | 1/2024 | Nyamwange | H04L 9/3239 |
| 2024/0039723 A1 * | 2/2024 | Ito | H04L 9/3263 |
| 2024/0214194 A1 * | 6/2024 | Kapur | H04L 9/088 |
| 2024/0340179 A1 * | 10/2024 | De La Rosa | H04L 9/3239 |

FOREIGN PATENT DOCUMENTS

WO      WO-2024022089 A1 *   2/2024   ............... H04L 9/32

OTHER PUBLICATIONS

Prakash et al, Decentralized Metadata Storage for Non-Fungible Token Collections Using Interplanetary File System, 2023 7th International Conference on Electronics, Materials Engineering & Nano-Technology, p. 1-6 (Year: 2023).*

* cited by examiner

*Primary Examiner* — Christopher A Revak
(74) *Attorney, Agent, or Firm* — Clause Eight; Michael Catania

(57) ABSTRACT

A method and system for generating a limited mutable non-fungible token (NFT) digital certificate of authenticity (COA) are disclosed herein. The method and system create JavaScript Object Notation (JSON) files comprising metadata of an NFT as normal, and each of the JSON files has different COA status. The NFT is minted using a decentralized unique address as a metadata URI.

7 Claims, 10 Drawing Sheets

100

101

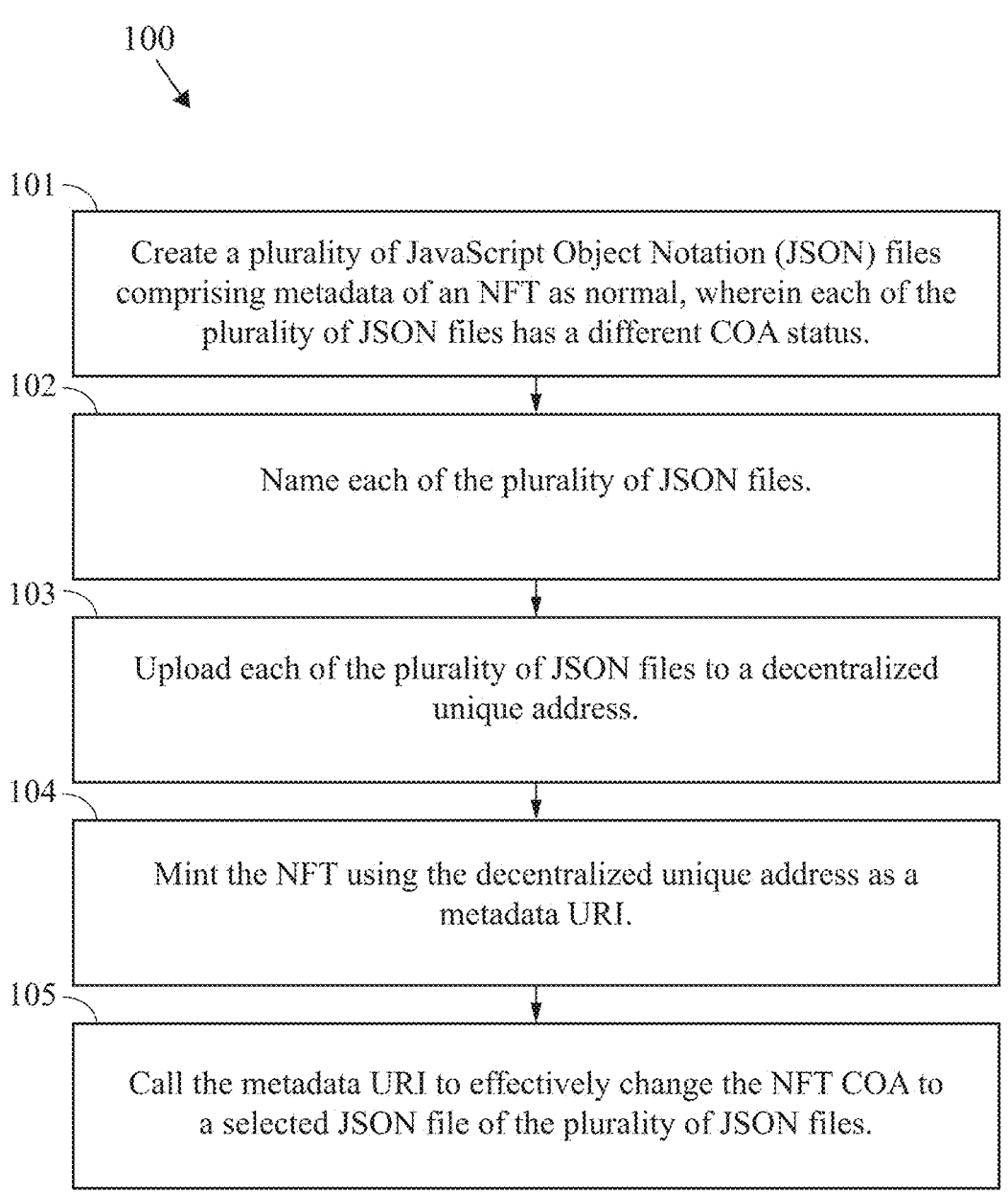

Create a plurality of JavaScript Object Notation (JSON) files comprising metadata of an NFT as normal, wherein each of the plurality of JSON files has a different COA status.

102

Name each of the plurality of JSON files.

103

Upload each of the plurality of JSON files to a decentralized unique address.

104

Mint the NFT using the decentralized unique address as a metadata URI.

105

Call the metadata URI to effectively change the NFT COA to a selected JSON file of the plurality of JSON files.

FIG. 1

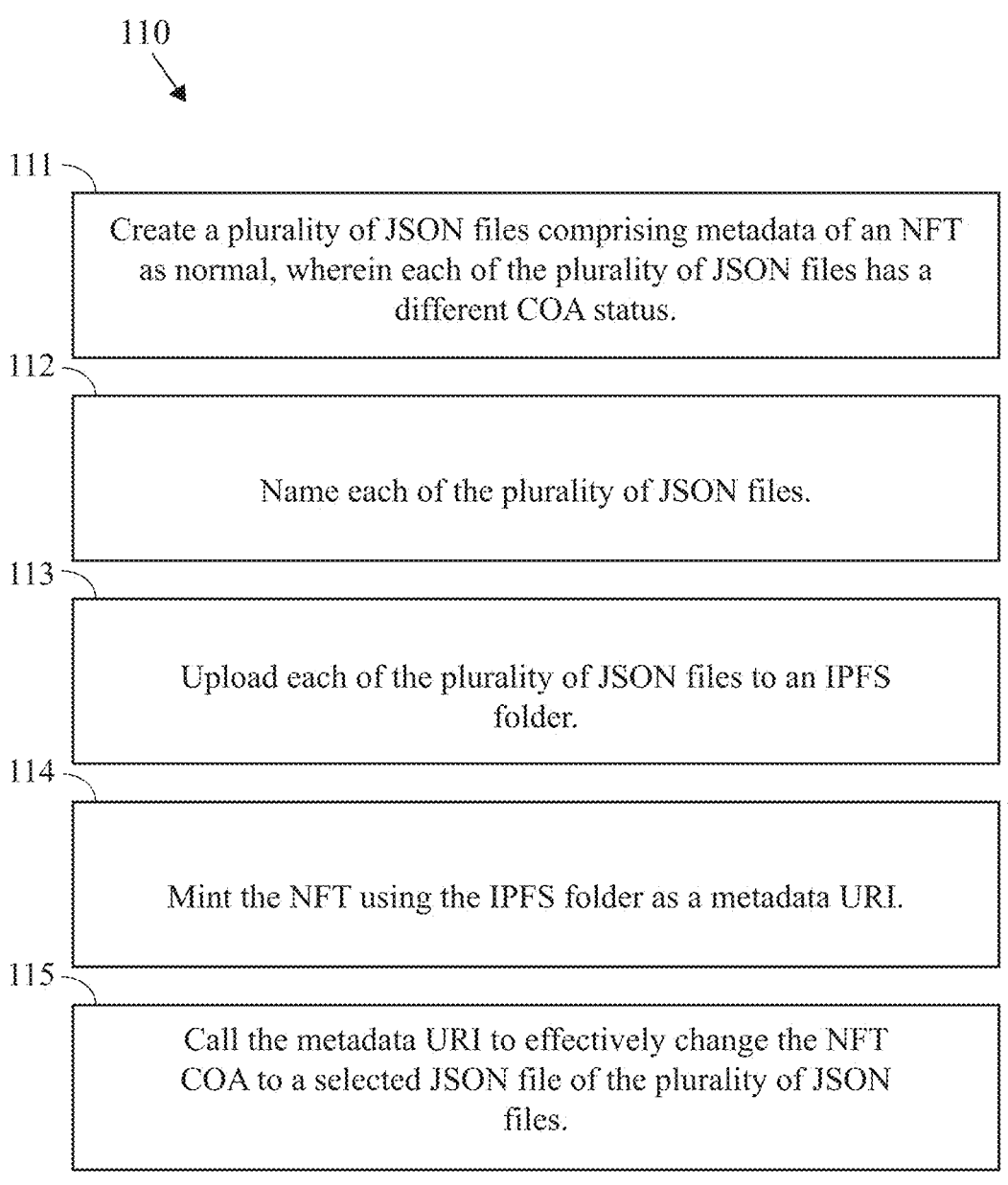

110

111 Create a plurality of JSON files comprising metadata of an NFT as normal, wherein each of the plurality of JSON files has a different COA status.

112 Name each of the plurality of JSON files.

113 Upload each of the plurality of JSON files to an IPFS folder.

114 Mint the NFT using the IPFS folder as a metadata URI.

115 Call the metadata URI to effectively change the NFT COA to a selected JSON file of the plurality of JSON files.

FIG. 2

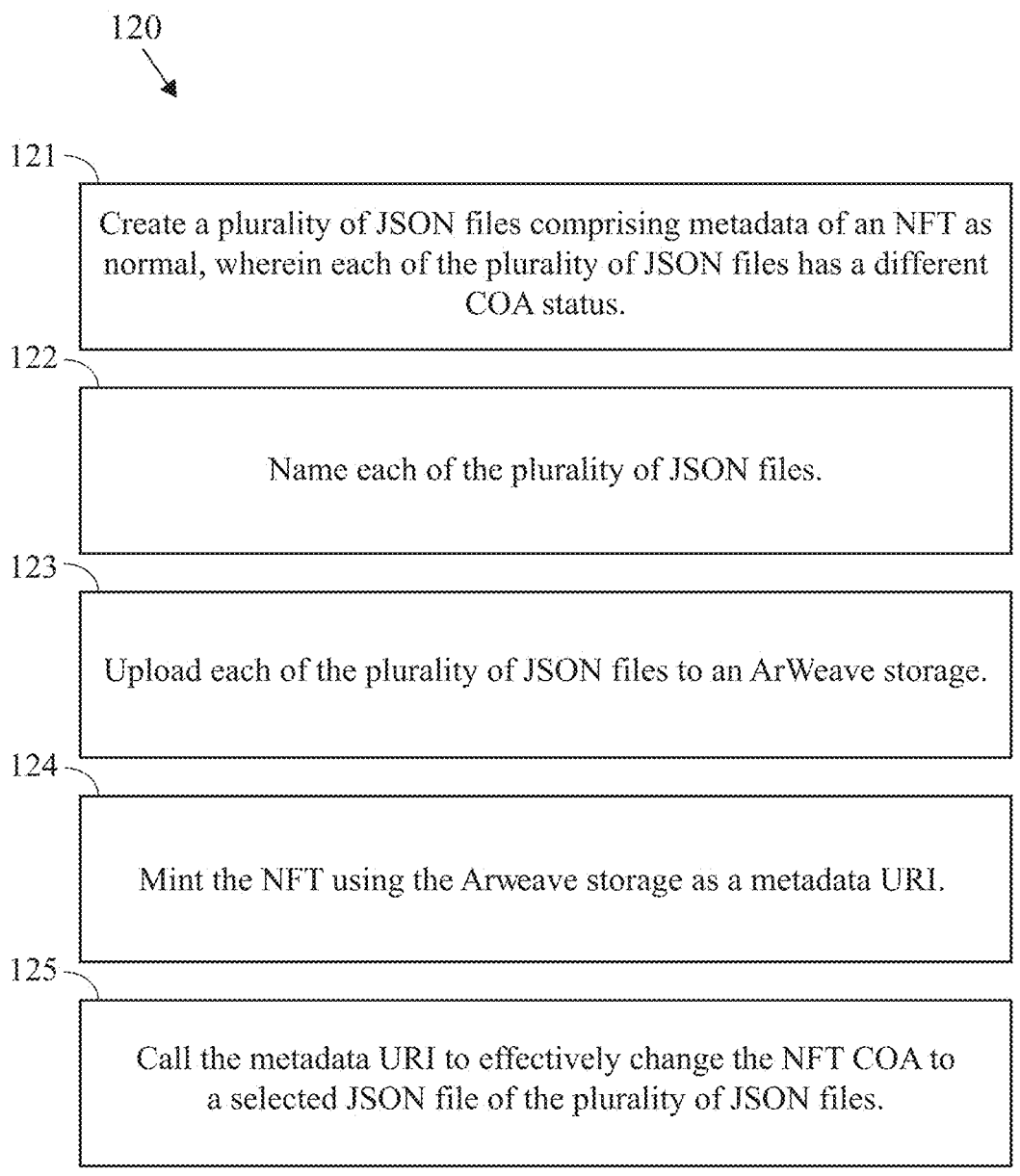

120

121

Create a plurality of JSON files comprising metadata of an NFT as normal, wherein each of the plurality of JSON files has a different COA status.

122

Name each of the plurality of JSON files.

123

Upload each of the plurality of JSON files to an ArWeave storage.

124

Mint the NFT using the Arweave storage as a metadata URI.

125

Call the metadata URI to effectively change the NFT COA to a selected JSON file of the plurality of JSON files.

```
mapping(int=> int) tokenStatus;
mapping(int=> string) folderURI;

function tokenURI( uint256 tokenId) returns (string memory){
        int currentStatus = tokenStatus[tokenId];
        string fileName;

if (currentStatus == 0) { fileName = "coa.json"; }
        else if (currentStatus == 1) { fileName = "coa_plus.json"; }
        else {  fileName = "unverified.json"; }
        return "ipfg://" + folderURI[toeknId] + "/" + fileName;
}
```

Example URI for an NFT in the COA state:

ipfs://Qmaf...j134/coa.json

FIG. 7

800 ipfs://<folderCID>/unverified.json ⌐801

900 ipfs://<folderCID>/coa.json 901

```
{
  "name": "A walk in Paris",
  "status": "COA",
  "image": "ipfs://<folderCID>/coa.png"
}
```

904 Unverified Record

905 COA

903 Token ID

906 COA Plus

907 Redeemed

902

*COA* ✓

Verified by Verisart

1000 ipfs://<folderCID>/redeemed.json        1001

```
{
  "name": "<Redeemed> A walk in Paris",
  "status": "REDEEMED",
  "image": "ipfs://<folderCID>/redeemed.png"
}
```

1004

Unverified Record

1008

Issuer Certificate

1003

Token ID

1005

COA

1006

COA Plus

1007

Redeemed

1002

*Redeemed*

Verified by Verisart

1

METHOD AND SYSTEM FOR GENERATING A LIMITED MUTABLE NFT DIGITAL CERTIFICATE OF AUTHENTICITY

CROSS REFERENCES TO RELATED APPLICATIONS

The Present Application is a continuation-in-part application of U.S. patent application Ser. No. 17/988,644, filed on Nov. 16, 2022, which claims priority to U.S. Provisional Patent Application No. 63/281,542, filed on Nov. 19, 2021, and is a continuation-in-part application of U.S. patent application Ser. No. 17/384,432, filed on Jul. 23, 2021, now U.S. patent Ser. No. 11/764,974, issued on Sep. 19, 2023, which is a continuation-in-part application of U.S. patent application Ser. No. 17/156,163, filed on Jan. 22, 2021, now U.S. patent Ser. No. 11/075,766, issued on Jul. 27, 2021, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to non-fungible tokens.

Description of the Related Art

There is a desire for an immutable non-fungible token (NFT) digital certificate of authenticity (COA), however, there is also a desire to have the NFT COAs upgradable in terms of a COA status. However, there is also a need to prevent third-parties from malicious behavior towards the NFT COA such as changing other metadata including images, titles and the like.

BRIEF SUMMARY OF THE INVENTION

The present invention provides a solution for immutable NFT COAs that are upgradeable in terms of COA status.

The present invention allows for state changing of the NFT COA for physical assets is based on external inputs such as creator authorization, NFC tagging or signing, redemption of tokens and production of physical works.

The present invention also provides gas efficient limited mutability of the NFT COA.

Further, even if a malicious party gained access to the administrative rights to the NFT contract, the malicious party would only be able to make limited changes to the metadata. This ensures that the value and provenance of the NFT is not damaged (no changes to the core metadata).

One aspect of the present invention is a method for generating a limited mutable non-fungible token (NFT) digital certificate of authenticity (COA). The method includes creating a plurality of JavaScript Object Notation (JSON) files comprising metadata of an NFT as normal, wherein each of the plurality of JSON files has as different COA status. The method also includes naming each of the plurality of JSON files. The method also includes uploading each of the plurality of JSON files to a decentralized unique address and/or on a decentralized file storage system. The method also includes minting the NFT using the decentralized unique address as a metadata URI. The method also includes calling the metadata URI to effectively change the NFT COA to a selected JSON file of the plurality of JSON files.

Another aspect of the present invention is a method for generating a limited mutable non-fungible token (NFT) digital certificate of authenticity (COA). The method includes creating a plurality of JavaScript Object Notation (JSON) files comprising metadata of an NFT as normal, wherein each of the plurality of JSON files has as different COA status. The method also includes naming each of the plurality of JSON files. The method also includes uploading each of the plurality of JSON files to an IPFS folder. The method also includes minting the NFT using the IPFS folder as a metadata URI. The method also includes calling the metadata URI to effectively change the NFT COA to a selected JSON file of the plurality of JSON files.

Yet another aspect of the present invention is a method for generating a limited mutable non-fungible token (NFT) digital certificate of authenticity (COA). The method includes creating a plurality of JavaScript Object Notation (JSON) files comprising metadata of an NFT as normal, wherein each of the plurality of JSON files has as different COA status. The method also includes naming each of the plurality of JSON files. The method also includes uploading each of the plurality of JSON files to an Arweave storage or any other form of decentralized file storage. The method also includes minting the NFT using the Arweave folder as a metadata URI. The method also includes calling the metadata URI to effectively change the NFT COA to a selected JSON file of the plurality of JSON files.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 1 is a flow chart of a preferred method for generating a limited mutable NFT digital COA.

FIG. 2 is a flow chart of an alternative method for generating a limited mutable NFT digital COA.

FIG. 3 is a flow chart of an alternative method for generating a limited mutable NFT digital COA.

FIG. 7 is an illustration of gas efficient lookup of NFT metadata.

DETAILED DESCRIPTION OF THE INVENTION

Figure 4:
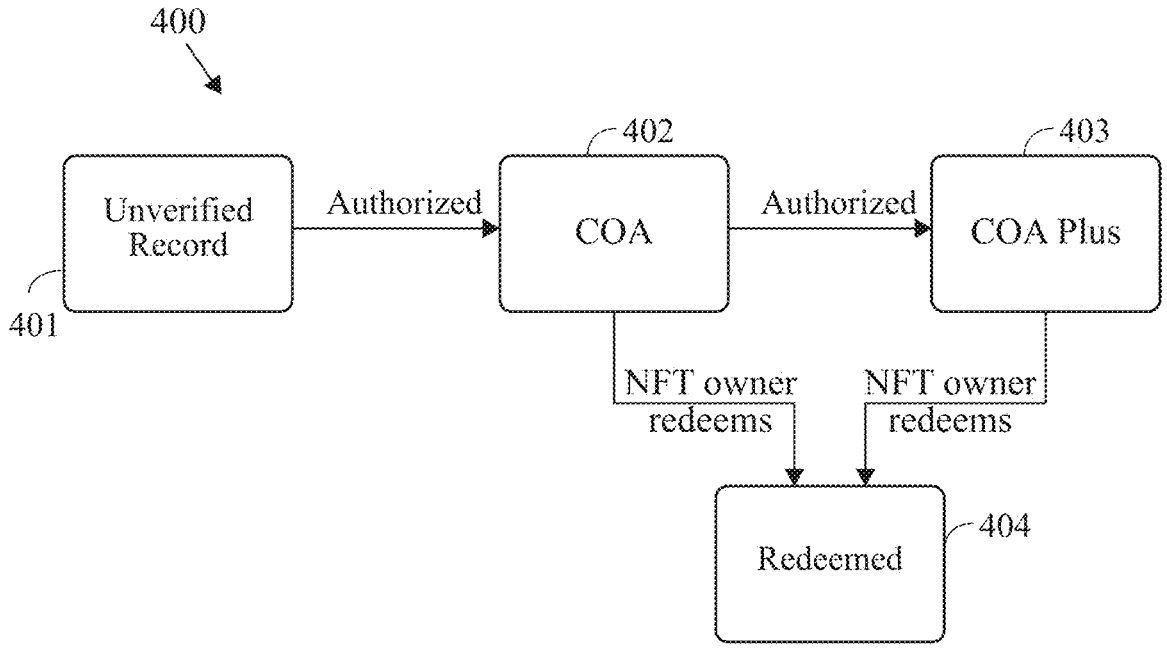
FIG. 4 is a block diagram of a COA as an NFT moving through multiple states.

A preferred embodiment is a state changing of the NFT COA for physical assets based on external inputs.

An alternative embodiment is gas efficient limited muta-bility. Only certain fields of the metadata of an NFT can be changed, and the entirety of the fields cannot be changed by anyone. For example, the title and other key metadata is immutable. The possible states of changes are locked-in at the time of minting of the NFT. An image of the NFT can be changed but only to one of a known pre-agreed set of images. Since storing the metadata on-chain is prohibitively expensive, the present invention stores the metadata off-chain in an immutable decentralized storage system (IPFS, Arweave) while still allowing limited mutability.

FIG. 1 is a flow chart of a method 100 for generating a limited mutable NFT digital COA. At block 101 multiple JavaScript Object Notation (JSON) files comprising meta-data of an NFT as normal are created. Each of the JSON files has a different COA status. At block 102, each of the JSON files are named. At block 103, each of the JSON files is uploaded to a decentralized unique address and/or on a decentralized file storage system. At block 104, the NFT is minted using the decentralized unique address as a metadata URI. At block 105, the metadata URI is called to effectively change the NFT COA to a selected JSON file of the JSON files.

FIG. 2 is a flow chart of a method 200 for generating a limited mutable NFT digital COA. At block 201 multiple JSON files comprising metadata of an NFT as normal are created. Each of the JSON files has a different COA status. At block 202, each of the JSON files are named. At block 203, each of the JSON files is uploaded to an IPFS folder. At block 204, the NFT is minted using the IPFS folder as a metadata URI. At block 205, the metadata URI is called to effectively change the NFT COA to a selected JSON file of the JSON files.

FIG. 3 is a flow chart of a method 300 for generating a limited mutable NFT digital COA. At block 301 multiple JSON files comprising metadata of an NFT as normal are created. Each of the JSON files has a different COA status. At block 302, each of the JSON files are named. At block 303, each of the JSON files is uploaded to an Arweave storage and/or on a decentralized file storage system. At block 304, the NFT is minted using the Arweave folder as a metadata URI. At block 305, the metadata URI is called to effectively change the NFT COA to a selected JSON file of the JSON files.

FIG. 4 is a block diagram 400 of a COA as an NFT moving through multiple states. At block 401, the NFT is an unverified record. Once the unverified record is approved it becomes a COA at block 402. Further approval transforms it into a COA plus at block 403. Once the NFT owner redeems the NFT, the NFT has a status changed to redeemed at block 404.

Figure 5:
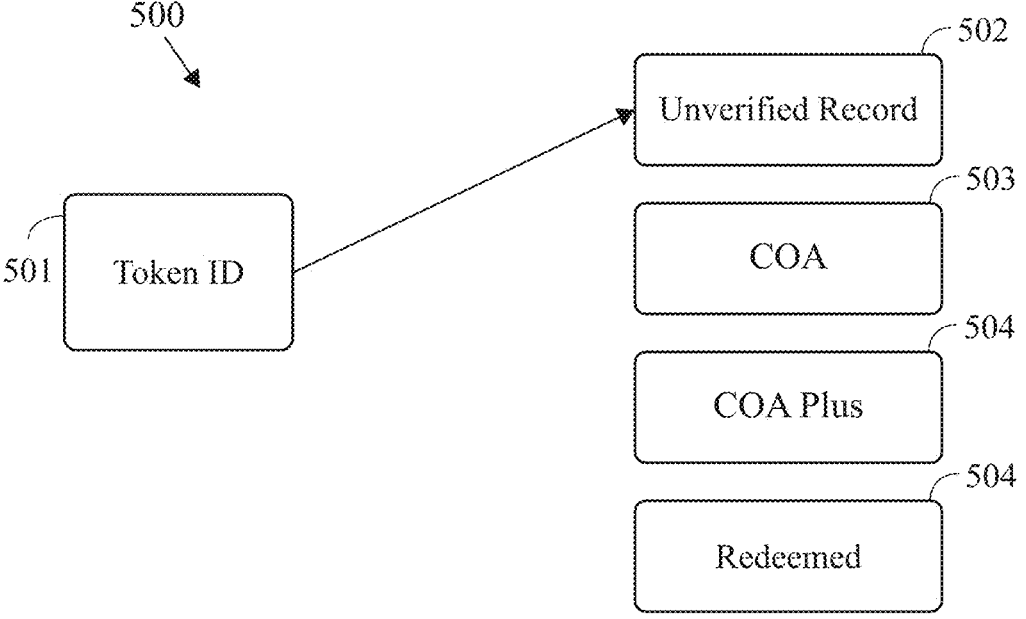
FIG. 5 is a block diagram of gas efficient storage of statuses.

FIG. 5 is a block diagram 500 of gas efficient storage of statuses, with the COA as NFT for physical assets' state is stored efficiently on chain. At block 501, the token ID is mapped to an enumeration (stored as an integer or similar) and initially has an unverified record state as shown in block 502. The "null" or zero value is defaulted to the COA status to save blockchain transaction processing fees (gas). It will then move to multiple states such as COA at block 503, COA Plus at block 504 and Redeemed at block 504.

Figure 6A:
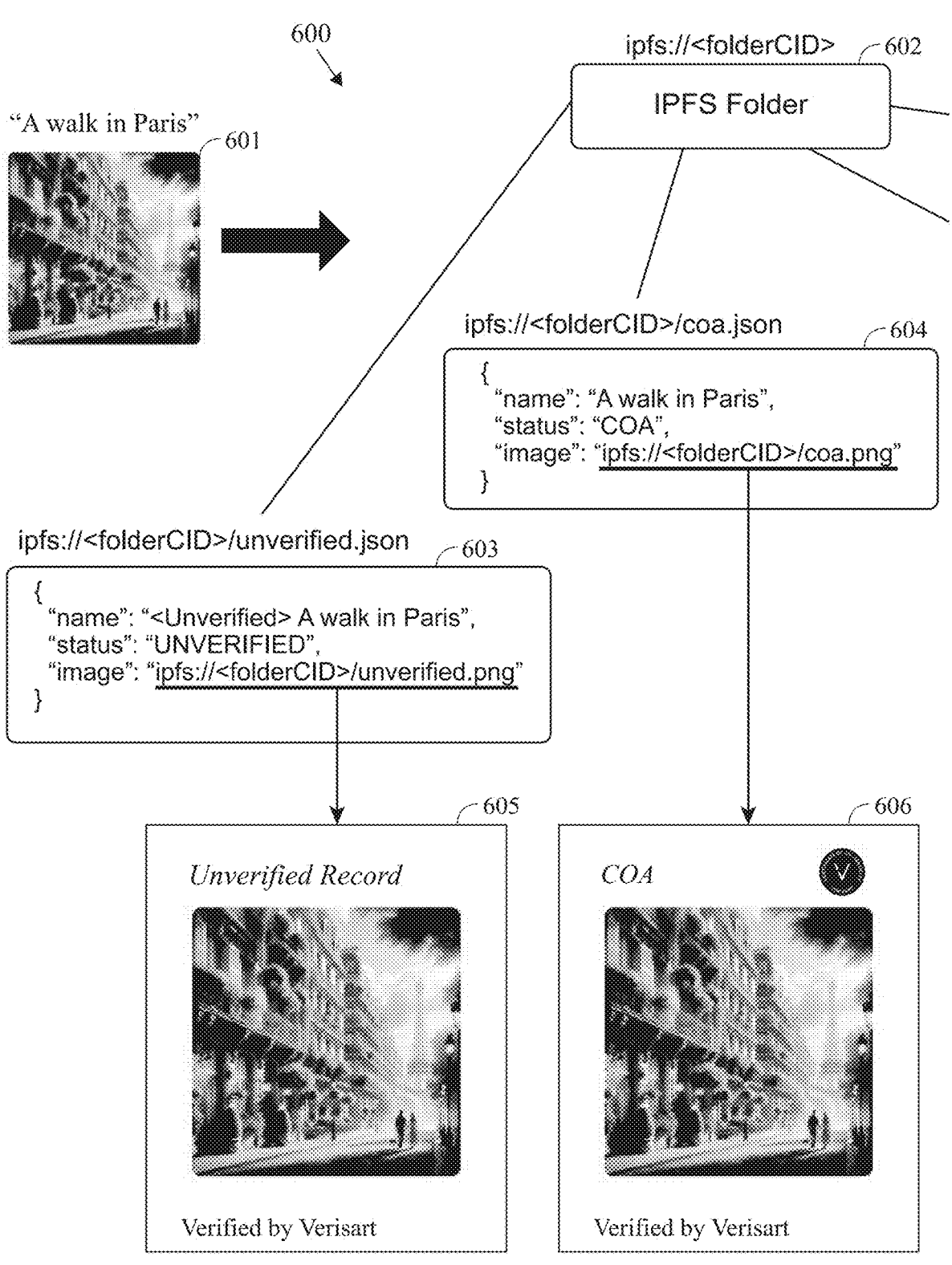
FIG. 6A is a block diagram of asset generation.
Figure 6B:
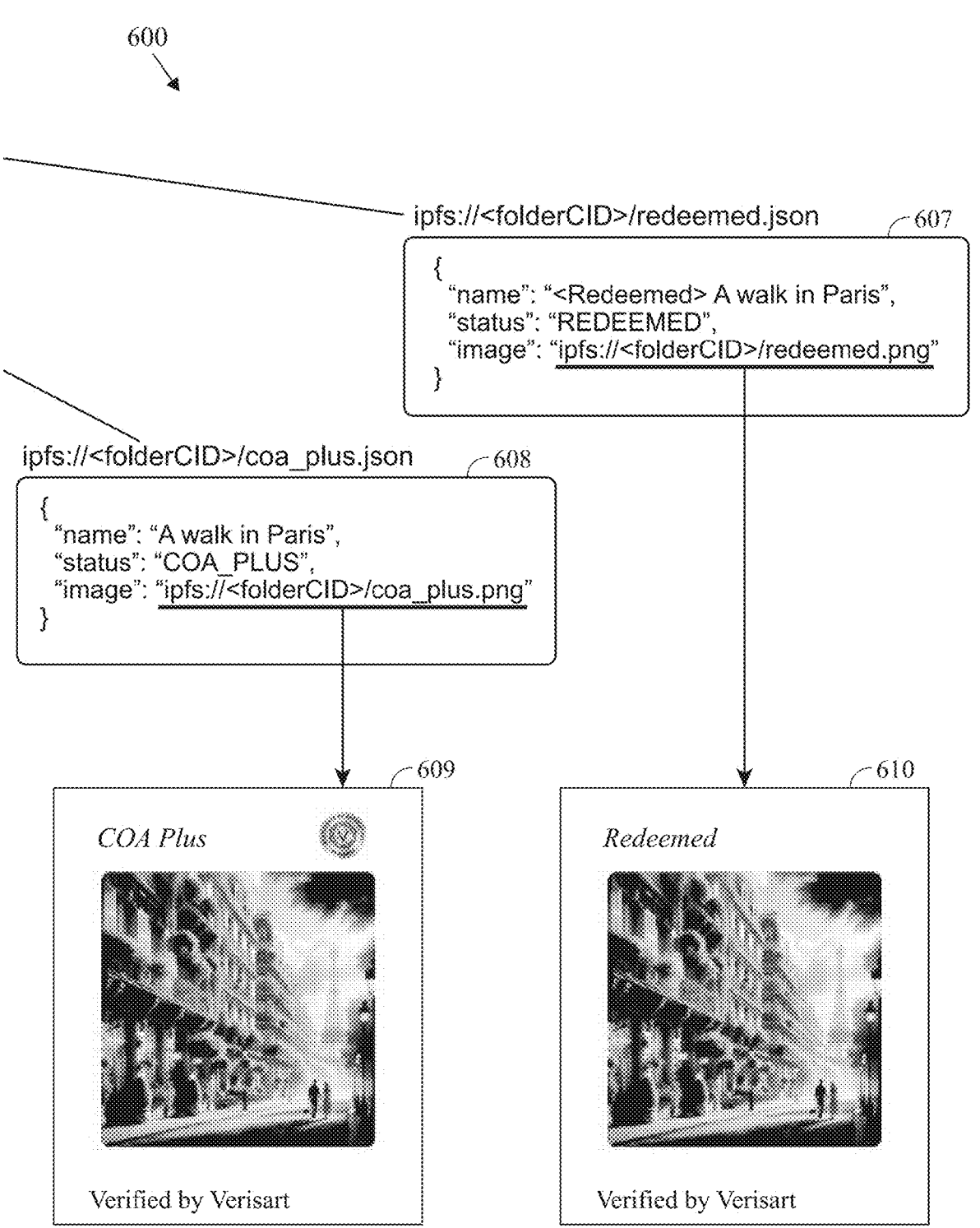
FIG. 6B is a continuation of the block diagram of FIG. 6A.

FIGS. 6A and 6B illustrate a block diagram 600 of asset generation. The physical asset, 601, is "A Walk In Paris" which will be minted into an NFT. At the time of minting of the NFT, a decentralized unique address 602, such as a IPFS folder, is created with the JSON files and images for all possible states: an unverified state 603; a COA state 604; a COA plus state 608; and a redeemed state 607. Other states are possible including Issuer State. The CID for the decen-tralized unique address is saved into the NFT in an immu-table manner.

For the unverified state 603, the JSON folder created at the decentralized unique address is ipfs://<folderCID>/un-verified.json. The name is "<Unverified> A walk in Paris". The status is "UNVERIFIED". The image 605 is at ipfs://<folderCID>/unverified.png. An unverified status contains claims which are permanently registered on the blockchain through authentication service's system, but there is low confidence its authenticity because of the following. 1) It has not been authorized or endorsed by the artist or maker; creators themselves are the most reliable source of informa-tion about objects they've made. Without authorization or endorsement by them, claims of authenticity are weak. 2) The issuer's identity has not been verified. Without proof of the issuer's identity real-world identity, a specific individual cannot ultimately be held accountable for the claims.

For the COA state 604, the JSON folder created at the decentralized unique address is ipfs://<folderCID>/coa.json. The name is "<COA> A walk in Paris". The status is "COA". The image 606 is at ipfs://<folderCID>/coa.png. A COA status meets the minimum criteria for authenticity: 1) the artist or maker has authorized the issuer or endorsed the certificate; 2) the issuer's identity and credentials have been verified. A more detailed explanation of COA status is set forth in U.S. patent Ser. No. 11/764,974, for a Method And System For Certification And Authentication Of Objects, and U.S. patent application Ser. No. 17/988,644, for a Systems and Methods For Certifying And Transacting PBT-Linked Physical Artifacts, both of which are hereby incor-porated by reference in their entireties.

For the COA PLUS state 608, the JSON folder created at the decentralized unique address is ipfs://<folderCID>/coa_plus.json. The name is "A walk in Paris". The status is "COA_PLUS". The image 606 is at ipfs://<folderCID>/coa_plus.png. A COA Plus status is that a link has been established between the physical object and the digital certificate. An additional proof required may include at least 2 high-quality images of the physical or digital object. A more detailed explanation of COA PLUS status is set forth in U.S. patent Ser. No. 11/764,974, for a Method And System For Certification And Authentication Of Objects, and U.S. patent application Ser. No. 17/988,644, for a Systems and Methods For Certifying And Transacting PBT-Linked Physical Artifacts, both of which are hereby incor-porated by reference in their entireties.

For the Redeemed state 607, the JSON folder created at the decentralized unique address is ipfs://<folderCID>/re-deemed.json. The name is "<Redeemed> A walk in Paris". The status is "REDEEMED". The image 610 is at ipfs://<folderCID>/redeemed.png.

FIG. 7 is an illustration of gas efficient lookup 700 of NFT metadata. As mentioned previously, only the decentralized unique address (e.g., IPFS folder) is stored on the block-chain. This results in a very gas efficient approach while still maintaining controlled immutability. The full URL of the NFT metadata can be dynamically created from the token status as shown in FIG. 7.

Figure 8:
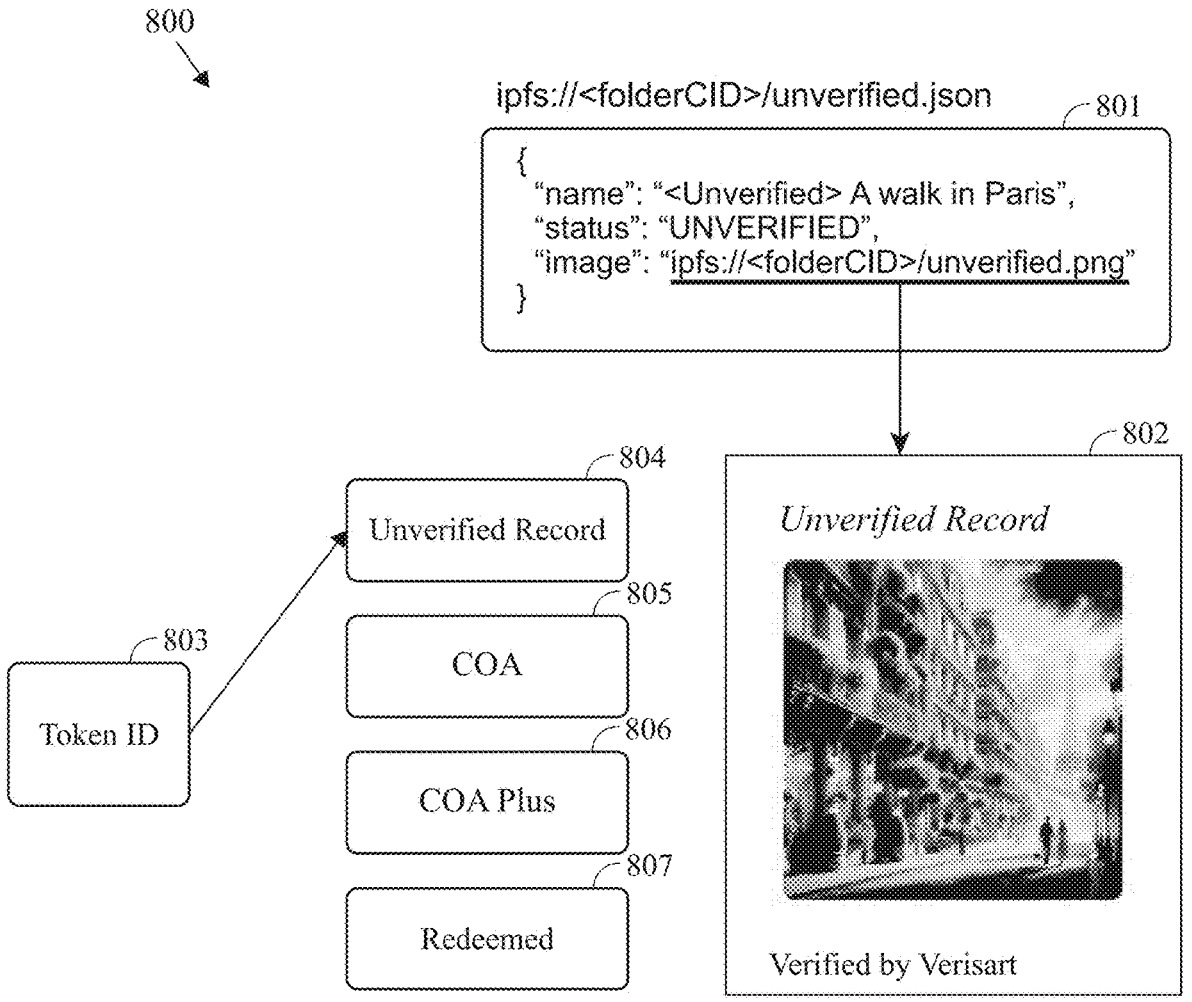
FIG. 8 is an illustration of an example of an unverified record status of an NFT.

FIG. 8 is an illustration of an example of an unverified record status 800 of an NFT. In this example, a user mints an NFT for their artwork. The full range of possible state metadata is generated. The IPFS folder CID is immutably stored on-chain. The record is not yet verified so the token status is "Unverified Record." Any third-party that inspects the metadata of the NFT will get the unverified metadata (and image) response. For the unverified state 801, the JSON folder created at the decentralized unique address is ipfs://<folderCID>/unverified.json. The name is "<Unverified> A walk in Paris". The status is "UNVERIFIED". The image 802 is at ipfs://<folderCID>/unverified.png. The token ID 803 has a status of unverified Record 804. The other states have been created, COA 805, COA Plus 806 and Redeemed 807.

Figure 9:
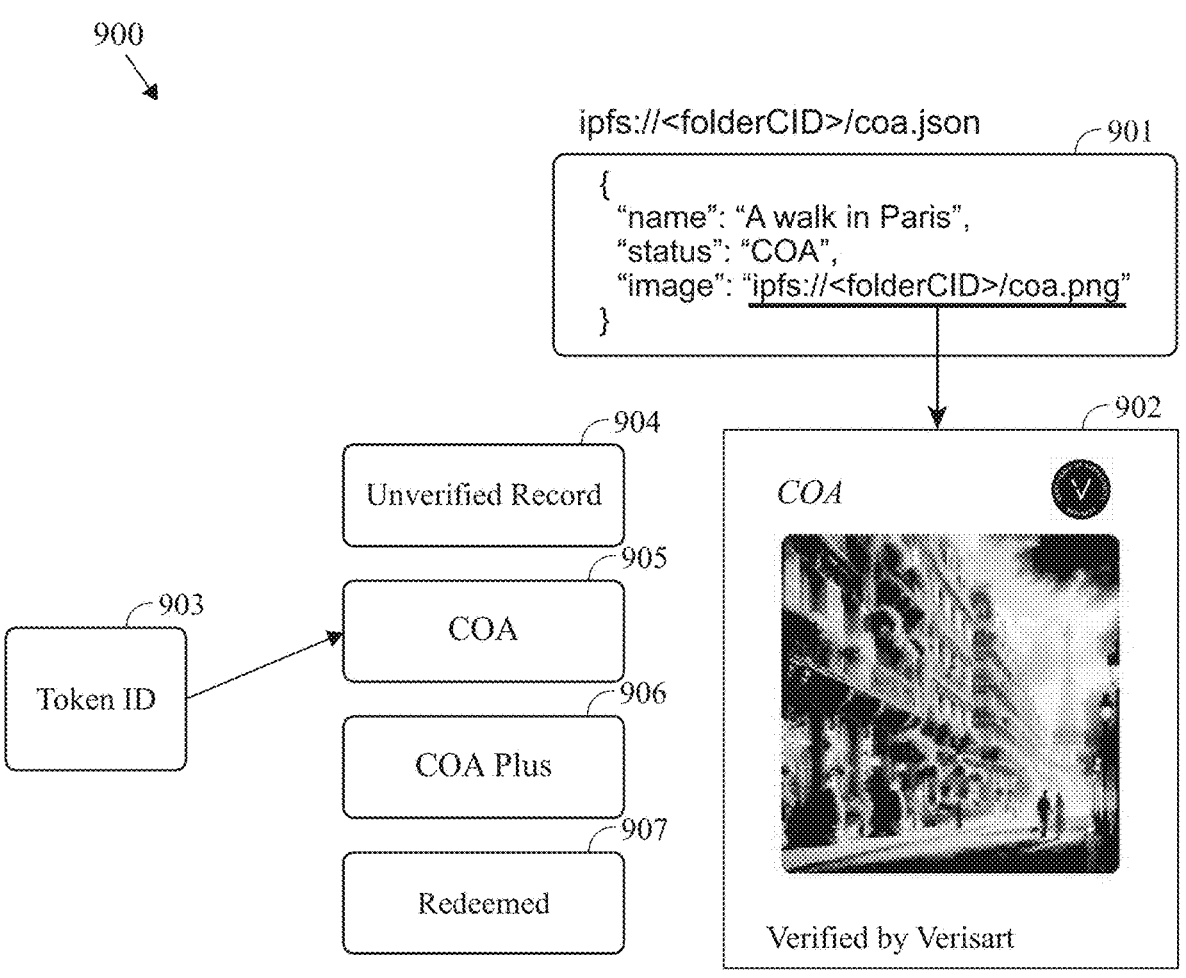
FIG. 9 is an illustration of an example of a COA status of an NFT.

FIG. 9 is an illustration of an example of a COA status of an NFT. After an authentication system completes real-world checks, the authentication system makes an on-chain call to upgrade the NFT to "COA" status. The NFT now has different metadata, suitable for a COA. The authentication system may later upgrade the COA to COA Plus status. For the COA state 900, the JSON folder 901 created at the decentralized unique address is ipfs://<folderCID>/coa.json. The name is "<COA> A walk in Paris". The status is "COA". The image 902 is at ipfs://<folderCID>/coa.png. The token ID 903 has a status of COA 905. The other states have been created, unverified record 904, COA Plus 906 and Redeemed 907.

Figure 10:
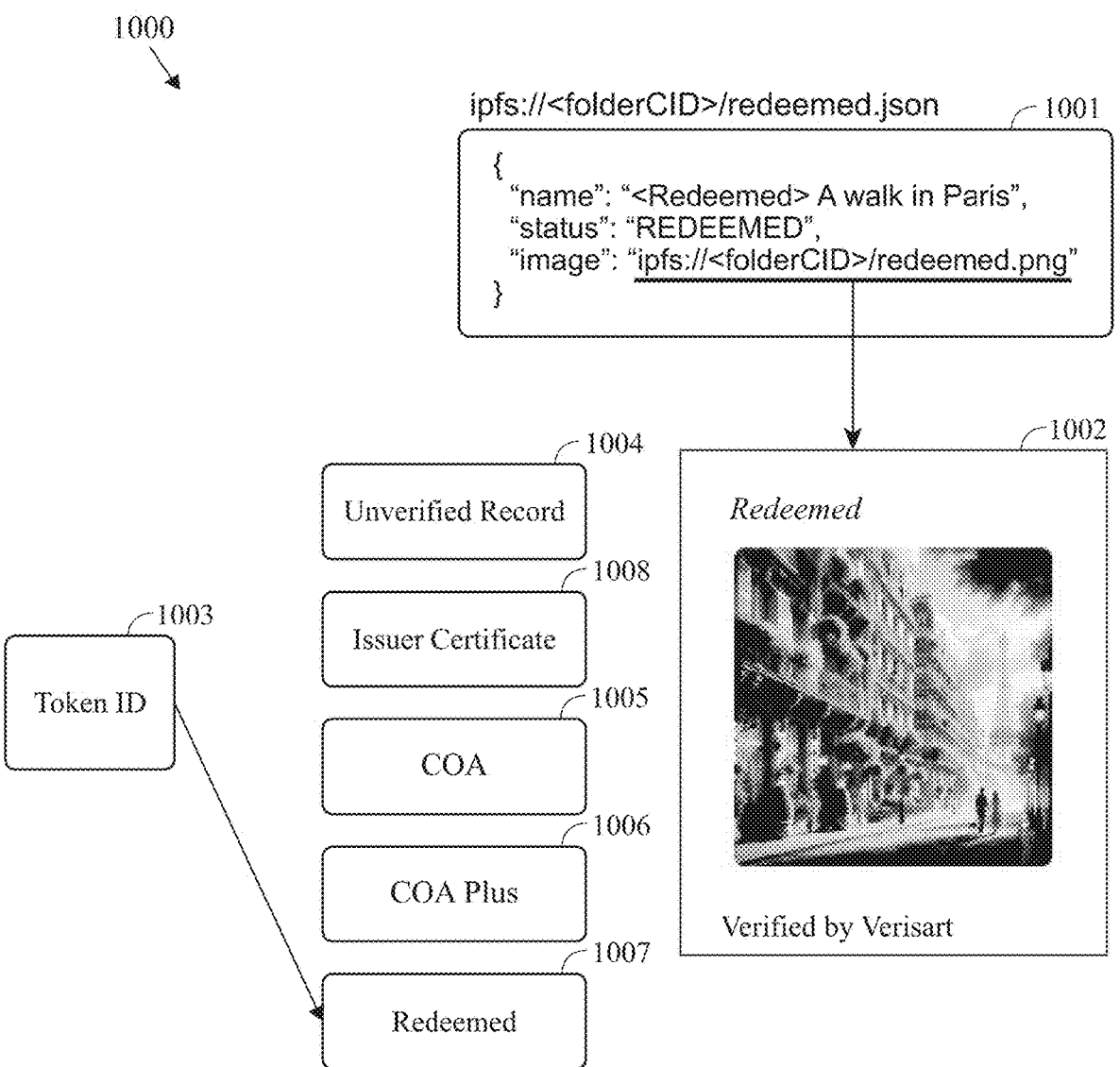
FIG. 10 is an illustration of an example of a redeemed status of an NFT.

FIG. 10 is an illustration of an example of a redeemed status of an NFT. IN this example, the NFT has some redeemable real-world reward. The owner of the NFT wishes to claim this redemption. The owner makes an on-chain call to move the status to Redeemed. The NFT now has different metadata, suitable for a redeemed COA. Interested parties (the authentication service and others) can act on the is state change to achieve a desired result (e.g., a real-world print generated, or some on-chain transaction such as issuing a new COA as NFT). For the Redeemed state 1000, the JSON folder created at the decentralized unique address is ipfs://<folderCID>/redeemed.json 1001. The name is "<Redeemed> A walk in Paris". The status is "REDEEMED" at 1007. The image 1002 is at ipfs://<folderCID>/redeemed.png. The token ID 1003 has a status of Redeemed 1007. The other states have been created: unverified record 1004, COA 1005, and COA Plus 1006. Other states are possible including Issuer Certificate State 1008.

At the point of minting an NFT, three JSON files containing the metadata of the NFT are created: each identical except for the COA status. Each will preferably have a slightly different image like a watermark/banner, or a different suffix on the title (e.g. My work [COA+]).

In one example, the files are named: rr.json, coa.json, coaplus.json.

In a preferred embodiment, the files are uploaded to an IPFS folder. The creates an IPFS CID, e.g., Om-AifbcqA . . . hd827.

The NFT is then minted using the IPFS folder as the metadata URI.

In a contract for the NFT, there is a map of: token-ID→certStatus.

A getURI method is preferably written so that it appends the status to the URI. The getURI will return: ipfs://meta-dataUR>/<COA_Status>, for example ipfs:??0m-AifbcbgA . . . hd827/rr.son.

In a preferred embodiment, there is a changeState( ) function only accessible from the owner of the contract, which allows the owner to change the mapping but nothing else. When the changeState( ) function is called, the URI is effectively changed to one of the predetermined files, but without allowing any additional changes. The present invention thus provides an essentially immutable metadata without permitting arbitrary changes.

This is effectively decentralized since the user does have a choice at the point of minting: the user can see the IPFS folder and check that the expected metadata is present, and then refuse to mint if the user does not like it.

This works since the IPFS folder nodes are immutable, including the contents. The metadata can be refreshed automatically by issuing a special event to sites such as Open-Sea.

In an alternative embodiment, to save gas, an empty mapping state is made mean COA (assuming COA is the 80% use case).

In a preferred embodiment, all possible JSON metadata files will exist in IPFS at the beginning.

The status can be one-way (e.g. it can only go up the COA ladder but never down), or the method can permit changing the status at will.

Norton et al., U.S. patent Ser. No. 11/075,766 for a Method And System For Certification And Authentication Of Objects, is hereby incorporated by reference in its entirety.

Norton et al., U.S. patent Ser. No. 11/764,974, for a Method And System For Certification And Authentication Of Objects, is hereby incorporated by reference in its entirety.

Norton et al., U.S. patent application Ser. No. 17/988,644, filed on Nov. 16, 2022, for a Systems and Methods For Certifying And Transacting PBT-Linked Physical Artifacts, is hereby incorporated by reference in its entirety.

An operating system controls the execution of other computer programs, running of the PSO platform, and provides scheduling, input-output control, file and data management, memory management, and communication control and related services. The operating system may be, for example WINDOWS (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), APPLE OS X, iOs and variants thereof (available from Apple, Inc. of Cupertino, Calif.), or the like.

The method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

Definitions

An application programming interface or API is a connection between computer programs wherein one program offers a known a service to another program. A program may offer an API locally to other programs on the same computer or a program may offer an API through a network interface.

Audio computer file formats include 3GP, AA, AAC, MP3 OGG, WAV, WMA, WEBM, and similar.

A blockchain is a list of records linked cryptographically and stored on a computer network. Constituent records are called blocks and typically comprise a cryptographic hash of the previous block and a timestamp. Example blockchains include Bitcoin, Ethereum, Polygon, Binance, Ripple, Cardano, Solana, Polkadot, Near, Avalanche, Litecoin, Monero, Arbitrum, Optimism, Lightning Network, and similar. Blockchains known as Layer-1 blockchains exists independently, blockchains known as Layer-2 are dependent on Layer-1 blockchains.

A blockchain address is a string associated with a public-private keypair for a user on a blockchain. Blockchain addresses are commonly represented as hexadecimal strings such as 0x1234ABC. Blockchain smart contracts are typically assigned a unique blockchain address to which users send messages to execute the program.

A blockchain smart contract is a computer program that is automatically executed by nodes of a blockchain network. Example blockchains that utilize smart contracts include Ethereum and Solana.

A blockchain token is a mathematical representation of asset ownership on a blockchain. Example Ethereum token types include ERC-20 fungible tokens, ERC-721 non-fungible tokens, and ERC-1155 semi-fungible tokens.

A client is a computer initiating a request to a server computer over a network.

Cloud computing is the process of granting on-demand control of a computer to a user over a network.

A cloud provider is a legal person offering cloud computing. Example cloud providers include Amazon Web Services, Google Cloud, and Microsoft Azure.

Cloud storage is the special case of cloud computing focused on offering on-demand storage and network transmission of data.

A CNN is a class of artificial neural network (ANN), most commonly applied to analyze visual imagery.

A computer or computing device or computing system is a physical device comprising at least one computer-readable storage medium and at least one processor. A computer operates by reading input data from a computer-readable storage medium, reading instructions from a computer readable storage medium, and executing the input data and instructions with the processor to produce output data. Output data is typically stored in a computer-readable storage medium and/or outputted to a user. Computer form factors include desktops, laptops, smart phones, smart watches, and servers.

A computer network is two or more computers comminating. Network data may be sent as electric pulses over copper wire, light pulses over optical fiber, and/or radio waves over the air.

A CRSM or computer-readable storage medium or computer data storage medium or storage is a physical device containing input data and/or instructions for use by a computer. Common CRSMs include hard drives (HDD), solid state drives (SSD), flash drives, tape drives, magnetic tape, Compact Discs (CD), Digital Video Discs (DVD), Blue-rays, optical drives, floppy disks, zip drives, random access memory (RAM), read only memory (ROM), and punch cards.

CRUD or create/read/update/delete or manipulate are the four basic operations on stored data. In SQL, these terms typically correspond to INSERT, SELECT, UPDATE, and DELETE. In HTTP, these terms typically correspond to POST, GET, PUT, DELETE.

A database or data base or DB or computer database is an organized set of data stored on a computer-readable storage medium for manipulation by a database program.

A database cell is the value of one row at one column in a database table.

A database column is a set of values of a particular type, with each row having one value per column in a table.

A database management system or DBMS or database program or database software is a special case program to manipulate a database. Example database management systems include MySQL, Microsoft Access, SQLite, PostgreSQL, MariaDB, Couchbase, Redis, MongoDB, and HBase.

A domain name is an identification string that defines a realm of administrative authority within the Internet. Domain names are used in various networking contexts and for application-specific naming and addressing purposes. Generally, a domain name points to a server at a given IP address.

A download is the transmission of data from a server computer to a client computer over a network.

Hardware or computer hardware is the collection of physical devices comprising a computer.

A hash function is a function that converts input data of arbitrary size to an output value of fixed size. Hashes are often used in checksums, check digits, fingerprints, lossy compression, randomization functions, error-correcting codes, and ciphers. Hashes may be implemented by software, hardware, or both. Example hash functions include Secure Hash Algorithm 2 (SHA2), Message-Digest Algorithm 5 (MD5), and cyclic redundancy check 32 (CRC32).

HTML or HyperText Markup Language is the standard markup language for displaying documents in a web browser.

An input device is a physical device which initiates a computer execution. Such execution includes storing data, storing instructions, and/or selecting instructions and data to execute in the future. Input devices include computer keyboards, keypads, computer mice, touch screens, microphones, cameras, card readers, scanners, bar code readers, chip readers, magnetic tape readers, network modem (wired or wireless), and Bluetooth receiver.

The Internet is the global system of interconnected computer networks that uses the TCP/IP protocol to communicate.

An Internet Protocol address or IP address is a unique number identifying a computer connected to the Internet. Internet Protocol version 4 (IPv4) addresses comprise 32 bits. Internet Protocol version 6 (IPv6) addresses comprise 128 bits.

IoT or Internet of Things describes physical objects with sensors, processing ability, software and other technologies that connect and exchange data with other devices and systems over the Internet or other communications networks.

JSON or JavaScript Object Notation is an open standard file format and data interchange format that uses human-readable text to store and communicate data objects consisting of attribute-value pairs and arrays.

A markup language is a syntax for annotating a document in a way that is visually distinguishable from the content. Markup languages typically do not contain executable instructions. Example markup languages include HTML, LaTex, and Markdown.

Metadata is data that provides information about other data, but not the content of the data itself. Metadata may describe the format, size, compression, authorship, ownership, copyright, legal, creation date, modification date, ordering, keywords, permissions, or other information about the primary data.

A microprocessor is a special case processor that converts a digital electric input signal into a digital electric output signal through a clock-driven integrated circuit comprising logic gates. Example commercial microprocessors include the Intel 4004, the Intel Pentium line, the IBM PowerPC line, the and the Motorola 68000.

A mobile application is an application that runs on a portable computer. Example mobile application operating systems include Apple iOS and Google Android.

Multimedia computer file formats include DOC, DOCX, FLV, HTML, OPD, PDF, PPT, and PPTX.

A network protocol is a predefined signal syntax allowing two computers to communicate over a network. Protocols may be implemented by software, hardware, or both. Protocols are typically 'layered,' wherein more specific protocols are transmitted within more generic protocols. Example protocols include Address Resolution Protocol (ARP), Internetwork Packet Exchange (IPX), Transmission Control Protocol (TCP), Internet Protocol (IP), User Datagram Protocol (UDP), HyperText Transfer Protocol (HTTP), Secure Socket Layer (SSL), Transport Layer Security (TLS), File Transport Protocol (FTP), Secure File Transport Protocol (SFTP), Secure Shell (SSH), Telnet, Domain Name System (DNS), Internet Control Message Protocol (ICMP), NetBIOS, Remote Procedure Call (RPC), Internet Relay Chat (IRC), Network Time Protocol (NTP), Internet Message Access Protocol (IMAP), Post Office Protocol (POP), and Simple Mail Transfer Protocol (SMTP).

A neural network or NN or artificial neural network or ANN is a computing system inspired by the biological neural network, typically comprising layers of neurons interconnected by synapses.

A NFT or non-fungible token is a unique and non-interchangeable unit of data stored on a blockchain. NFTs use a digital ledger to provide a public certificate of authenticity or proof of ownership. The lack of interchangeability (fungibility) distinguishes NFTs from blockchain cryptocurrencies, such as Bitcoin.

An operating system is system software that manages computer hardware and software resources, and provides common services for computer programs. Example operating systems include Linux, Unix, Apple iOS, Apple MacOS, and Microsoft Windows.

A physical backed token (PBT) is an NFC chip cryptographically linked to an NFT which ensures the works, via the NFC chip, must be in the hands of the new collector or their authorized entity before the NFT transfer can be completed, and in one embodiment an PBT is an open-source token standard that connects ownership of physical items to their digital counterparts on a blockchain.

A processor is a physical device that deterministically executes input signals into output signals. Signals are typically electric. Signals may be digital or analog.

A program or computer program or piece of software or software program or computer application or application or app is a distinct document of software. A program may reference and execute other programs. Example programs include Microsoft Word, WordPress, Apple iOS, and SQLite.

A programming language is a formal language comprising a set of strings that instruct a computer processor. There are a number of programming languages, each having a specific syntax to encode instructions. Programming languages are typically compiled to machine code for execution at the processor. Example programming languages include: ASP, BASIC, C, C#, C++, COBOL, Erlang, Go, Haskell, Java, JavaScript, Lisp, Objective-C, Perl, Python, PHP, Ruby, Rust, Scala, Solidity, and Vyper.

Public-key cryptography or asymmetric cryptography is the field of cryptographic systems that use pairs of related keys. Each key pair consists of a public key and a corresponding private key. Key pairs are generated with cryptographic algorithms based on mathematical problems termed one-way functions. Security of public-key cryptography depends on keeping the private key secret; the public key can be openly distributed without compromising security.

A REST or representational state transfer is an API design in which a client sends an HTTP request to a server which responds with structured data in XML, JSON, similar format.

A RNN or recurrent neural network is a class of artificial neural network (ANN) where connections between nodes can create a cycle, allowing output from some nodes to affect subsequent input to the same nodes.

A server or web server or network server is a special case computer optimized for receiving requests and sending responses over a computer network.

Software or computer software or computer code or code is instructions stored on a computer-readable storage medium to be executed by a computer processor.

SQL or Simple Query Language is a domain-specific computer language for manipulating data in a relational database management system.

An URL or uniform resource locator or web address is a reference to a web resource that specifies its location on a computer network and a mechanism for retrieving it. A typical URL could have the form http://www.example.com/index.html, which indicates a protocol (http), a hostname (www.example.com), and a file name (index.html).

A URI or uniform resource identifier is a unique sequence of characters that identifies an abstract or physical resource and is a means for locating and retrieving information resources on a network.

A user is an entity initiating an execution on a computer. Typically, a user is a human interacting with an input device. Alternatively, a user is a second computer programmed to interact with the former computer.

A web browser or browser or Internet browser is a program for browsing the World Wide Web. A typically browser function is to download and render a webpage comprising HTML, JavaScript, and/or CSS. Example web browsers include Microsoft Internet Explorer, Microsoft Edge, Google Chrome, Apple Safari, and Mozilla Firefox.

A webpage or web page is an HTML document on the World Wide Web.

A website or web site is a group of related web pages controlled by one legal person.

The World Wide Web or WWW or web is an information network of hyperlinked documents transmitted from web servers to client web browsers over the Internet using the HTTP protocol invented by Sir Timothy Berners-Lee in 1989 at CERN. Transmitted documents typically comprise HTML, CSS, and JavaScript.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim.

Therefore, the embodiments of the invention in which an exclusive property or privilege is claimed are defined in the following appended claims.

We claim as our invention the following:

1. A method for generating a limited mutable non-fungible token (NFT) digital certificate of authenticity (COA) for a physical object, the method comprising:

creating a plurality of JavaScript Object Notation (JSON) files comprising metadata of an NFT as normal, wherein each of the plurality of JSON files has a different COA status comprising at least three of an unverified status, a COA status, a COA plus status and a redeemed status, wherein the unverified status contains claims which are permanently registered on a blockchain through an authentication service's system, wherein the COA status meets a minimum criteria for authenticity 1) the artist or maker has authorized the issuer or endorsed the COA and 2) the issuer's identity and credentials have been verified, wherein the COA plus status has a link established between the physical object and the digital COA, wherein the redeemed status is for on-chain redemptions;

naming each of the plurality of JSON files;

uploading each of the plurality of JSON files to an off-blockchain decentralized unique address;

minting the NFT using the decentralized unique address as a metadata URI, wherein a title of the NFT COA is immutable after minting; and calling the metadata URI to effectively change the NFT COA to a selected JSON file of the plurality of JSON files.

2. The method according to claim 1 wherein the decentralized unique address is an IPFS folder, an Arweave storage or another decentralized file storage.

3. The method according to claim 1 wherein the decentralized unique address comprises images for each of the plurality of JSON files.

4. The method according to claim 1 wherein a content Identification (CID) of the decentralized folder is stored on-chain.

5. The method according to claim 1 wherein the NFT COA is configured to only allow an owner of the NFT to move the NFT COA to a redeemed status.

6. A method for generating a limited mutable non-fungible token (NFT) digital certificate of authenticity (COA), the method comprising:

creating a plurality of JavaScript Object Notation (JSON) files comprising metadata of an NFT as normal, wherein each of the plurality of JSON files has a different COA status comprising at least three of an unverified status, a COA status, a COA plus status and a redeemed status, wherein the unverified status contains claims which are permanently registered on a blockchain through an authentication service's system, wherein the COA status meets a minimum criteria for authenticity 1) the artist or maker has authorized the issuer or endorsed the COA and 2) the issuer's identity and credentials have been verified, wherein the COA plus status has a link established between the physical object and the digital COA, wherein the redeemed status is for on-chain redemptions;

naming each of the plurality of JSON files;

uploading each of the plurality of JSON files to an IPFS folder;

minting the NFT using the IPFS folder as a metadata URI wherein a title of the NFT COA is immutable after minting; and calling the metadata URI to effectively change the NFT COA to a selected JSON file of the plurality of JSON files.

7. A method for generating a limited mutable non-fungible token (NFT) digital certificate of authenticity (COA), the method comprising:

creating a plurality of JavaScript Object Notation (JSON) files comprising metadata of an NFT as normal, wherein each of the plurality of JSON files has a different COA status comprising at least three of an unverified status, a COA status, a COA plus status and a redeemed status, wherein the unverified status contains claims which are permanently registered on a blockchain through an authentication service's system, wherein the COA status meets a minimum criteria for authenticity 1) the artist or maker has authorized the issuer or endorsed the COA and 2) the issuer's identity and credentials have been verified, wherein the COA plus status has a link established between the physical object and the digital COA, wherein the redeemed status is for on-chain redemptions;

naming each of the plurality of JSON files;

uploading each of the plurality of JSON files to an Arweave folder;

minting the NFT using the Arweave folder as a metadata URI wherein a title of the NFT COA is immutable after minting; and calling the metadata URI to effectively change the NFT COA to a selected JSON file of the plurality of JSON files.

\* \* \* \* \*